(No Model.) 2 Sheets—Sheet 2.
H. J. HAIGHT.
ELECTRICAL TRANSMISSION OF TELEGRAPHIC AND TIME INDICATIONS.
No. 454,867. Patented June 30, 1891.
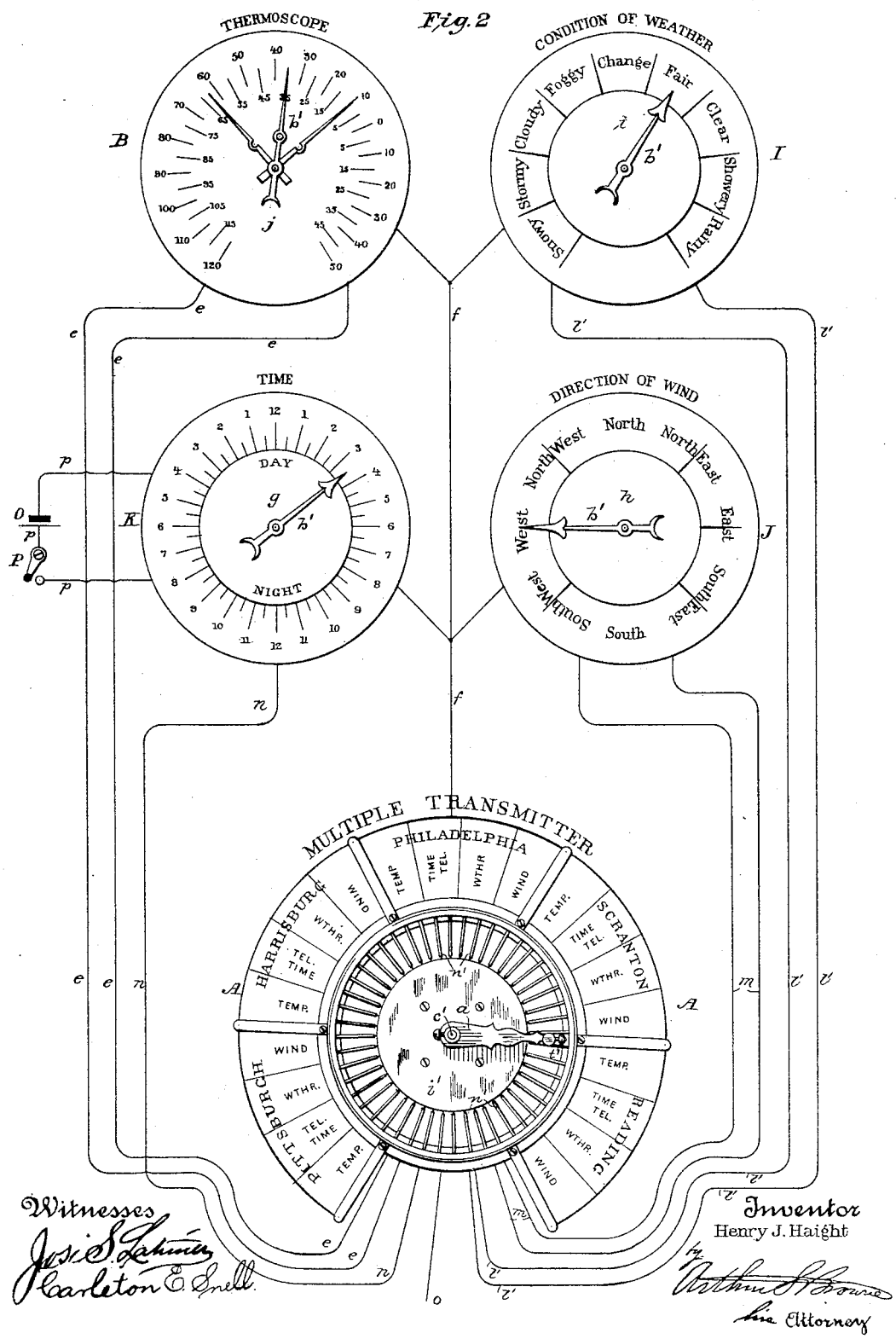
Witnesses
Inventor
Henry J. Haight

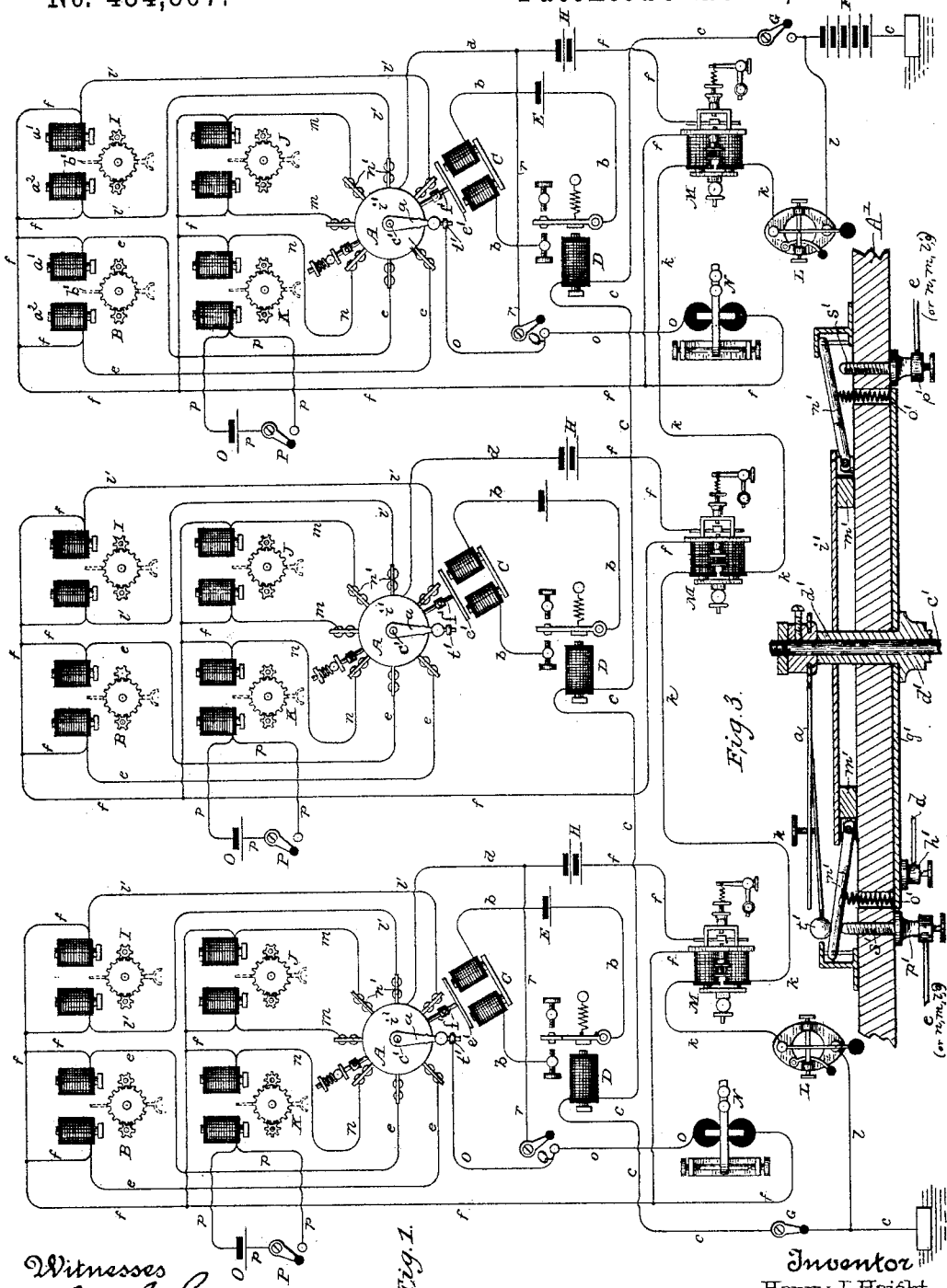

UNITED STATES PATENT OFFICE.

HENRY JANSEN HAIGHT, OF NEW YORK, N. Y.

ELECTRICAL TRANSMISSION OF TELEGRAPHIC AND TIME INDICATIONS.

SPECIFICATION forming part of Letters Patent No. 454,867, dated June 30, 1891.

Application filed March 27, 1889. Serial No. 305,010. (No model.)

*To all whom it may concern:*

Be it known that I, HENRY JANSEN HAIGHT, a citizen of the United States, residing in the city, county, and State of New York, have invented an improved system and means for the electric transmission of meteorological, telegraphic, and clock-time indications from one main or central station through distributing-circuits to sub-districts and sub-stations, of which the following is a specification.

In Letters Patent of the United States, No. 442,880, granted to me December 16, 1890, for a system for transmitting thermometric records from a central station to sub-districts or sub-stations, I set forth instruments and a system of electric-wire conduction for fully effecting the purpose.

In the present invention I use, in general, similar means for manipulation and a corresponding system of electric-wire conduction, and I add to the apparatus means for transmitting also telegraph communications and clock-time and other meteorological conditions—such as wind and weather indications—to the sub-districts and sub-stations from the said main station. The construction of the main transmitting apparatus and electric-wire system in connection therewith being fully set forth in the said Letters Patent, I refer thereto for a full description of the same, and herein give a detailed description only of the additional instruments and parts required to fulfill the additional functions above enumerated.

In the accompanying drawings, Figure 1 is a diagram showing by conventional devices the instruments and parts forming the complete apparatus and the electric-wire communications between the several parts of the apparatus. Fig. 2 is a face view, on a larger scale, of the different instruments employed, except for the telegraph and Fig. 3 is a detail sectional view of the multiple transmitter.

Referring first to Fig. 1, I show the apparatus for three different districts and the connecting-wires between the same. I show in each division or district a multiple transmitter A, having a circuit-closing turning index $a$ for bringing into successive operative relation the several electric circuits for the transmission of any one of the desired indications; a receiving-thermoscope B for indicating thermometric indications, and electro-magnet C in connection with the multiple transmitter for effecting the step-by-step turning of the index $a$; a relay-magnet D for alternately opening and closing the local electric circuit $b$, in which the magnet C is located; a local battery E in the local electric circuit $b$ for actuating the electro-magnet C; a main battery F in the main circuit $c$, extending throughout the entire series of divisions, districts, or stations, and which furnishes the electric force for actuating the relay-magnets D, a circuit closing and opening switch G for alternately opening and closing the main circuit $c$, a local battery H for actuating the indicating-thermoscope B; a local-circuit wire $d$, leading from the local battery H to the multiple transmitter A; two distributing-thermoscope circuit-wires $e$ $e$, leading from the multiple transmitter to the indicating-thermoscope B, and a return-circuit wire $f$, leading from the indicating-thermoscope B to the local battery H, all of which instruments or parts are shown and described in Patent No. 442,880, above specified, and which are here illustrated by conventional representations.

The essential features only of these indicating-instruments are shown. Each instrument includes a hand or index $b'$, which is actuated through well-known intermediate mechanism by two electro-magnets $a'$ $a^2$. When one magnet $a'$ is excited, the index $b'$ will be moved one step in one direction, and when the other magnet $a^2$ is excited the index $b'$ will be moved one step in the opposite direction. The construction of the indicating-instruments is well known and constitutes no part of the present invention. The construction of the multiple transmitter A also constitutes no part of the present invention, it being claimed in my said patent, No. 442,880, and hence only its essential features are illustrated. The circuit-closing index or arm $a$ of the multiple transmitter is carried by a rotary spindle $c'$, and this spindle is rotated step by step by a clock-work mechanism, (not shown,) the escapement-arm $f'$ of which is actuated by being connected with the armature $e'$ of the electro-magnet C. The spindle $c'$ turns in a metallic bearing $d'$, which is in contact with a metal plate $g'$ on the under side of the supporting-base $A'$, of insulating material, which supports the several parts. This plate $g'$ carries a binding-post $h'$, to which is attached the circuit-wire $d$, leading to the battery H. On the upper side of the base $A'$ is an annular metallic ring $m'$, concentric with the spindle $c$, which is metallically connected with the bearing $d'$ (and hence with wire $d$) by a metallic plate or cover $i'$. To this ring $m'$ are pivoted a series of metallic circuit-closing bars $n'$ $n'$, of any suitable or desirable number, which are normally held in an elevated position by coiled springs $o'$. The springs $o'$ bear against the plate $g'$, thus also establishing electric connection between the bars $n'$ and battery H. The bars $n'$ are thus seen to be at all times in electric connection with one pole of the battery H. Coacting with the several bars $n'$ are a series of fixed contacts $s'$, one for each bar. These contacts $s'$ are carried by binding-posts, from which lead the circuit-wires $e$, $l'$, $m$, $n$, and $o$, hereinafter referred to, which are adapted to be brought into connection with the opposite pole of the battery H. The bars $n'$ are normally held out of contact with their respective contacts $s'$ by the springs $o'$, and are depressed one by one and brought into contact with their respective contacts $s'$ by the arm or index $a$, which carries a knob $t'$ on its end, which presses upon a bar $n'$ and so causes it to come in contact with its contact $s'$ and so close the break in the circuit in which this particular bar $n'$ and contact $s'$ are located. The multiple transmitter is thus characterized by the movable arm or index $a$, which is adapted to open and close successively or in turn a plurality of electric circuits, the movement of index or arm $a$ being controlled by an electro-magnet.

The construction of the instruments thus far referred to constitutes no part of the present invention, except in so far as their essential features are combined with the features of the present invention.

For the purposes of this invention I add other indicators of meteorological phenomena—such as a weather-indicator I and a wind-indicator J—and also a time-indicator K, a telegraph-key L, a telegraph relay-magnet M, and a telegraph sounder or register N. All of these instruments are shown in the two terminal districts at the right and left hand of the diagram; but in the middle section or district there is not shown a telegraph-key L or sounder N. The telegraph key shown is intended to indicate the ordinary well-known Morse key, and the conventional figure shown as designating a sounder is intended to indicate the ordinary well-known Morse sounder or register.

Since the electro-magnetic instrument which serves for a receiving and indicating thermoscope is or may be an instrument of well-known character and construction, having an index which is adapted by the opening and closing of electric circuits to be turned step by step a certain predetermined limited distance in either direction, similar instruments may also serve for the receiving and indicating instruments of the wind, weather, and time indications, and consequently there are represented in the diagram, Fig. 1, the same conventional forms as for the indicating-thermoscopes. In Fig. 2, however, dials are shown having the proper readings for indicating the several phenomena transmitted by the apparatus. For example, the dial $g$ of the clock-time indicator is subdivided into such time intervals as it may be desired to transmit, the dial shown having the twenty-four hours of the day numbered consecutively thereon with minor subdivisions. The dial $h$ of the wind-indicator is marked in regular order with words or symbols indicating the direction of the wind. The dial $i$ of the weather-indicator is marked with words or symbols indicating the changes or phenomena of the weather, and the thermoscope-dial $j$ is marked with figures indicating degrees of temperature; but in each and every indicating-instrument it will be understood that each movement of the index carries the same from one word, symbol, or figure to the next in regular order forward or back, as the case may be.

Referring now to Fig. 1, the local circuit of each local battery H is completed through the armature of the relay-magnet M. The armature of this magnet opens and closes the local circuit by making and breaking the connection between two parts of the return-wire $f$. The relay-magnets M of the several stations are all connected in series by a circuit-wire $k$, connecting with the keys L, and the keys L are themselves connected with the main circuit $c$ by means of wires $l$ $l$.

The two circuit-wires $e$ $e$, which lead to the magnets $a'$ $a^2$ of the temperature-indicator or thermoscope B, are increasing and decreasing temperature wires, respectively, such as are ordinarily used with such instruments—that is, when the increasing-temperature wire is brought into the electric circuit by means of the opening and closing index $a$ of the multiple transmitter the index of the thermoscope may be successively moved, so as to indicate successively higher temperatures; but when the decreasing-temperature wire is brought into the electric circuit by means of the index of the multiple transmitter the thermoscope-index when moved will indicate successively lower temperatures.

The method of actuating the indexes of the thermoscopes is substantially the same as that described in Patent No. 442,880, above mentioned. Let it be assumed, for example, that the station indicated at the right hand of the diagram, Fig. 1, is a main or transmitting station, from which thermometric indications are to be simultaneously transmitted to several receiving sub-stations, such as those indicated in the diagram. The switch G in the main circuit c is first manipulated. Each movement of the key to close the circuit permits the passage of the electric current, thus exciting the several relay electro-magnets D of the main station as well as of the several sub-stations. The excitation of the several relay-magnets attracts their several armatures, thus closing the several local circuits b. The closing of these local circuits excites the several magnets C, thus synchronously moving the several indexes a a of the several multiple transmitters A A one point, as set forth in said Patent No. 442,880. When the operator at the main station opens the main circuit by means of moving the switch G in the opposite direction, the several relay-magnets D D are demagnetized, thus breaking the several local circuits b b, demagnetizing the several magnets C C, and thus moving the several indexes a a of the multiple transmitter another point, as set forth in said Patent No. 442,880. In this manner the indexes a a of the several multiple transmitters may be moved by the operator any number of times to bring the desired local circuits governed by the local batteries H into operative relation. The several multiple transmitters at the main and sub stations having originally been set once for all, so as to correspond with each other, the operator knows when he has thus brought the index a of the multiple transmitter at his (the main) station to the proper point that the indexes of the multiple transmitters at the several sub-stations have also been brought to their respective corresponding proper points. Assuming, then, that it is desired to transmit a given degree of temperature from the main station to the several sub-stations, the index of the indicating-thermoscope at the main station in the sight of the operator shows a degree of temperature corresponding with those of all the indicating-thermoscopes at the several sub-stations. This degree may be that at which the several instruments have been set at the first installation of the system, or may be the temperature which has last been transmitted. Assume, however, that the desired degree of temperature to be transmitted is higher than that which the indicating-thermoscope shows. In such case the operator moves the switch G until he brings the index a of each of the several multiple transmitters so as to connect the several increasing-temperature wires with the wires d, leading from the several local batteries H to the several multiple transmitters. By doing this the several local circuits leading to the increasing-temperature magnets of the several indicating-thermoscopes, respectively, are closed, with the exception of the breaks in the several return-wires f at the several relay-magnets M. This having been accomplished, the operator turns his attention to the key L. The manipulation of this key alternately opens and closes a circuit extending through the several relay-magnets M throughout the system, thus alternately exciting and demagnetizing the several relay-magnets, and so opening and closing the several local circuits controlled by the several local batteries H. The opening and closing of the local circuits controlled by the local batteries H actuates the increasing-temperature magnets of the several indicating-thermoscopes, so as to move the indexes thereof to indicate successively higher temperatures in the manner common to such instruments. The operator thus manipulates the key L until the index of the indicating-thermoscope at the main station, which is in his sight, shows the record desired to be transmitted, and then ceases the manipulation of the key. Since all of the indicating-thermoscopes have moved synchronously and uniformly, the desired temperature will be thus transmitted and indicated throughout the entire system. This operation for transmitting thermometric indications is substantially identical with that described in the aforesaid Patent No. 442,880. To extend the application of this system to the transmission of information concerning other meteorological phenomena—such as wind and weather indications and to telegraphic and time indications—the several indicating-instruments for these purposes—namely, those lettered I, J, K, and N—are also connected with the multiple transmitter. The multiple transmitter is connected with the weather-indicating instrument I by two wires l' l', with the wind-indicator J by two wires m m, with the clock-time indicator K by one wire n, and with the telegraph sounder N by one wire o. All of these several instruments are connected with the same return-wire f. By simply bringing the index a of the multiple transmitter round to the proper point any one of these wires at each of the several stations may be brought into operative relation with the local battery H, so that any desired information within the scope of the several indicating-instruments may be transmitted simultaneously and synchronously from the main station to all of the sub-stations. The method of moving the index of any one of the indicating-instruments when placed in circuit by the index of the multiple transmitter is effected by the manipulation of the key L exactly in the same manner as that described for moving the indicating-index of the thermoscope. The time-indicator K at each station is shown connected with the multiple transmitter by a single wire n, since it is ordinarily desirable to move the clock hand or index in one direction only. In case it is desired to move the index of the clock-time indicator in the opposite direction—as, for example, to correct the same—local means are shown at each station for effecting this result. The time-indicator has two operating-magnets, the same as the other indicators; but only one magnet (that which moves the index forward) is connected with the multiple transmitter. The other magnet for moving the index backward is located in a local circuit $p$, having a local battery O and an opening and closing key P. By manipulating this key the time-index may be moved backward, as desired. The telegraph-sounder N also is connected with the multiple transmitter by a single wire $o$, since one only is necessary, it having but a single mode of operation.

So far the apparatus and system have been described only with reference to the transmission of indications from the main station to the sub-stations, and as far as all the instruments (except the telegraph-sounder) are concerned the indications will be transmitted and registered until the next corresponding signals are sent without the necessity of there being any operators at the sub-stations. The central station (shown in Fig. 1) is a receiving indicating-station only, illustrating the fact that the system may be used with only such stations, if desired. The system may, however, be adapted to a series of both transmitting and receiving stations, in which any one of the stations in turn may become for the time being the main or transmitting station. Of course in such a case an operator must be located at each station. The diagram, Fig. 1, shows on the left hand a sub-station which may become a transmitting-station and indicates how the system may be thus applied. This station is therefore supplied with all the instruments which are at the station on the right, which has so far been considered as the transmitting or main station. As long as a station is used as a receiving-station only, its switch G and key L must be kept closed, (as indicated at the station at the left,) so that the control of the circuits may be managed exclusively at the transmitting-station. At each of the two end stations a shunt-circuit $r$ is shown connecting the local battery H directly with the sounder N, said circuit being controlled by a switch Q, so that the sounder may be operated independently of the multiple transmitter A in case the multiple transmitter is out of order, or for any other reason not to be used.

As illustrated in the diagram, Fig. 1, there is at each station a single set of indicating-instruments, and the multiple transmitters are shown with just the necessary number of contacts for these several instruments. In using an apparatus of this character, in case it is desired to transmit to the sub-stations in the circuit information concerning meteorological phenomena at various different places which had been reported at the main station, the name of one place would first be telegraphed by using the sounder, and then would follow the hour of the observations and the various indications for that place. Similar information would then be transmitted in succession concerning each locality which reported at the main station. This system, however, requires the presence of an operator at each sub-station to note down the name of each place and the data relating thereto. In Fig. 2, however, it is indicated how the apparatus may be entirely automatic at the receiving sub-stations, so that during the intervals between successive transmissions of data the indicating-instruments at each sub-station will indicate the various meteorological conditions at all of the stations or localities which are reported to the sub-stations. This is done by simply multiplying the indicating-instrument sufficiently to give a record of all the desired data for each of all the localities reported and by increasing the number of contacts made by the indexes of the multiple transmitter correspondingly. Thus in Fig. 2 the multiple transmitter is shown of a capacity sufficient to transmit temperature, wind, weather, time, and telegraphic indications from six localities, the information from which it is desired to transmit to a series of stations, which may or may not be the same as those whose indications are to be reported. It will be understood that in case of six localities with five characters of indications to be reported concerning each there would be thirty indicating-instruments at the main station and at each sub-station. In Fig. 2, however, only four of the indicating-instruments are shown, (since the others would be mere duplicates,) and no sounder is shown in this figure.

I claim as my invention—

1. A multiple transmitter comprising a plurality of fixed contacts or electrodes, and a circuit-closer adapted to bring said fixed contacts or electrodes one by one into electric connection with one pole of an electric generator, in combination with one or more indicating-thermoscopes, one or more weather-indicating instruments, one or more wind-indicating instruments, one or more time-indicating instruments, and one or more telegraph transmitting and receiving instruments for the purposes, all of which indicating-instruments are in electric connection with the opposite pole of said electric generator, electric-circuit wires connecting said indicating-instruments with said several fixed contacts or electrodes, respectively, and means for making and breaking the circuits between said indicating-instruments and said fixed contacts or electrodes independently of said circuit-closer, substantially as set forth.

2. A multiple transmitter comprising a plurality of fixed contacts or electrodes, and a circuit-closer adapted to bring said fixed contacts or electrodes one by one into electric connection with one pole of an electric generator, in combination with a clock-time-indicating instrument connected with the opposite pole of said electric generator, a single electric-circuit wire connecting said instrument with one of said fixed contacts or electrodes, a key for closing and opening said electric circuit independently of the circuit-closer of the multiple transmitter, a local circuit also connected with said clock-time-transmitting instrument for reversing the same, and a key for opening and closing said local circuit, substantially as set forth.

In witness whereof I have hereunto signed my name in the presence of two subscribing witnesses.

HENRY JANSEN HAIGHT.

Witnesses:
C. S. NEWELL,
CARLETON E. SNELL.